United States Patent [19]

Hoppie

[11] 4,310,079
[45] Jan. 12, 1982

[54] REGENERATIVE BRAKING DEVICE

[75] Inventor: Lyle O. Hoppie, Birmingham, Mich.

[73] Assignee: Eaton Corporation, Cleveland, Ohio

[21] Appl. No.: 95,901

[22] Filed: Nov. 19, 1979

[51] Int. Cl.$^3$ .................. B60K 41/28; F16H 37/08
[52] U.S. Cl. .................. 192/4 A; 192/48.9; 74/689; 74/695; 185/9; 74/572
[58] Field of Search .................. 192/4 R, 4 A, 1, 2, 192/48.9, 48.1; 74/695, 689, 751, 785, 572, 681; 185/9, 10, 11, 17, 40 H

[56] References Cited

U.S. PATENT DOCUMENTS

| | | |
|---|---|---|
| 1,030,051 | 6/1912 | Brundege . |
| 2,137,574 | 11/1938 | Kromer . |
| 3,126,070 | 3/1964 | Hayek . |
| 3,589,464 | 6/1971 | Katchamakoff .................. 185/10 X |
| 3,641,843 | 2/1972 | Lemmens .................. 74/751 |
| 4,110,982 | 9/1978 | Regar .................. 74/572 X |
| 4,136,581 | 1/1979 | Winter et al. .................. 74/689 |
| 4,159,042 | 6/1979 | Jayner .................. 185/40 H |
| 4,187,741 | 2/1980 | Nyman .................. 74/751 |

Primary Examiner—George H. Krizmanich
Attorney, Agent, or Firm—R. J. McCloskey

[57] ABSTRACT

Disclosed are several embodiments of a regenerative braking device for an automotive vehicle. The device includes a plurality of rubber rollers (24, 26) mounted for rotation between an input shaft (14) connectable to the vehicle drivetrain and an output shaft (16) which is drivingly connected to the input shaft by a variable ratio transmission (20). When the transmission ratio is such that the input shaft rotates faster than the output shaft, the rubber rollers are torsionally stressed to accumulate energy, thereby slowing the vehicle. When the transmission ratio is such that the output shaft rotates faster than the input shaft, the rubber rollers are torsionally relaxed to deliver accumulated energy, thereby accelerating or driving the vehicle.

17 Claims, 6 Drawing Figures

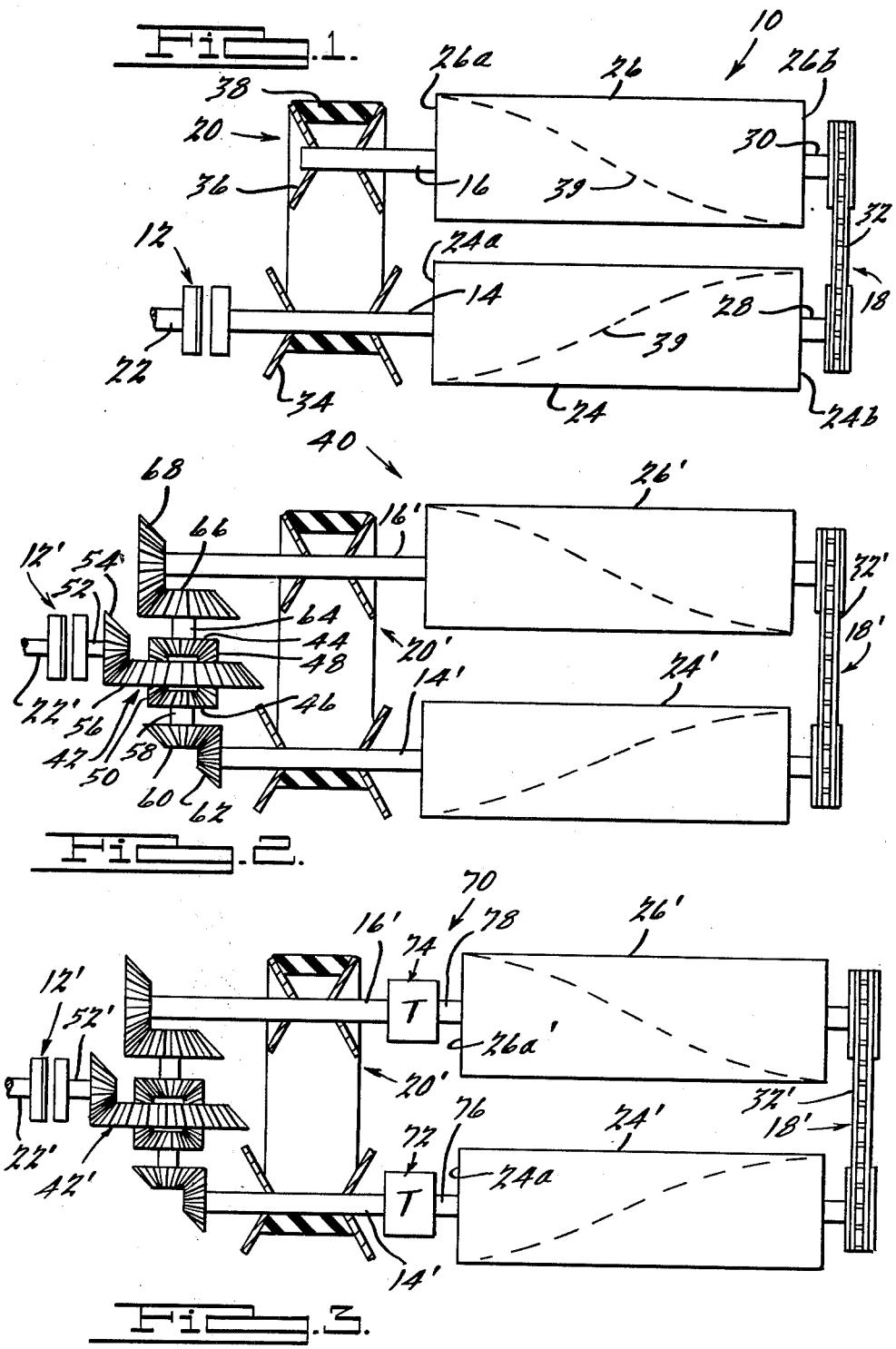

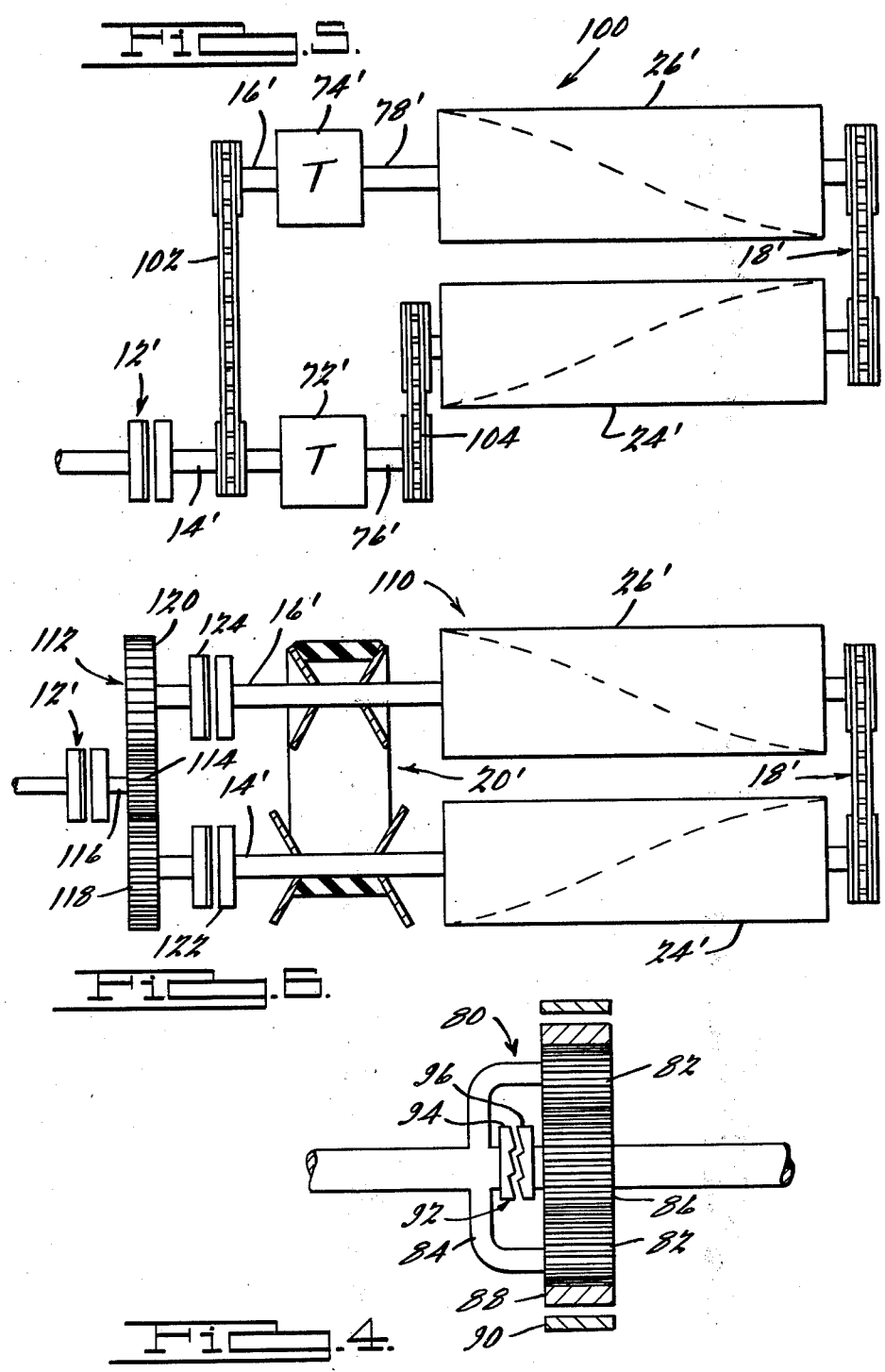

REGENERATIVE BRAKING DEVICE

FIELD OF THE INVENTION

The invention relates to regenerative braking and more specifically to regenerative braking of an automotive vehicle.

BACKGROUND OF THE INVENTION

Automotive regenerative braking devices having energy storage assemblies employing metal springs are well-known. In general such devices have been manually operated to effect vehicle braking by converting vehicle motion (kinetic energy) into resiliently stored potential energy and manually operated to effect vehicle acceleration with the stored energy. The storage assemblies employing metal springs have been unduly bulky and/or heavy. Further, the amount of braking and driving torque provided by such assemblies has not been readily controllable.

In a co-pending U.S. Pat. application, Ser. No. 944,442, filed Sept. 21, 1978 and now U.S. Pat. No. 4,246,988, applicant discloss a regenerative braking system having a control system for modulating braking and driving torque provided by a storage system having torsionally stressed rubber rollers. While this control system is an effective way to control braking and acceleration torque, it has the disadvantage of requiring rapid on-off control of clutches and brakes under relatively high torque loads and substantial rotational speed differences.

SUMMARY OF THE INVENTION

An object of this invention is to provide a regenerative braking device which smoothly transitions from a braking mode to a driving mode.

Another object of this invention is to provide a regenerative braking device wherein braking and driving torques provided by the device are controlled without the need of rapid on-off control of clutches and/or brakes.

According to a feature of the invention, the regenerative braking device includes an input shaft adapted for connection to a drivetrain of a machine such as an automotive vehicle drivetrain, an output shaft, an energy storage assembly operative to accumulate energy from the machine when the input shaft rotates faster than the output shaft and operative to deliver accumulated energy to the machine when the output shaft rotates faster than the input shaft, and a variable ratio transmission drivingly interconnecting the input and output shafts and operative to vary the rotational speed of the input shaft relative to the output shaft.

BRIEF DESCRIPTION OF THE DRAWINGS

The several embodiments of the invention are shown in the accompanying drawings in which:

FIG. 1–5 schematically illustrate five different regenerative braking embodiments of the invention; and FIG. 6 schematically illustrates a discrete ratio transmission which may be used in the several embodiments of the regenerative braking device.

Certain terminology referring to the proposed environment of the device, direction, and motion of components in the device will be used in the following description. This terminology is for convenience in describing the disclosed embodiments and shall not be considered limiting unless explicitly used in the appended claims.

DETAILED DESCRIPTION OF THE DRAWINGS

Referring now to FIG. 1, therein is shown a regenerative braking device 10 including an input/output clutch 12, an input shaft 14, an output shaft 16, an energy storage assembly 18, and a variable ratio transmission 20. Clutch 12 may be a conventional friction clutch connected on one side to a partially shown shaft 22 which is drivingly connected to an unshown drivetrain of a vehicle or a mass having variable kinetic energy. The other side of clutch 12 is connected directly to input shaft 14. Clutch 12 may be unapplied during steady state vehicle operation and applied when the vehicle is to be braked or accelerated.

Energy storage assembly 18 includes a plurality of rotatably mounted rubber bars or elastic rollers, herein rollers 24 and 26, fixed at their left hand ends 24a and 26a to the input and output shafts 14 and 16 and fixed at their right hand ends 24b and 26b to shafts 28 and 30. Shafts 28 and 30 are drivingly interconnected by a continuous chain or belt 32 which drives the shafts at a one-to-one speed ratio. Rollers 24 and 26 are shown connected in series between the input and output shafts; however, it should be clear that the rollers can be connected in parallel. The rollers are twisted or torsionally stressed to accumulate energy when input shaft 14 rotates faster than output shaft 16. When output shaft 16 rotates faster than input shaft 14, the rollers are unstressed or relaxed to deliver accumulated energy. It shold be clear that other types of energy storage means may be used in lieu of the rubber rollers, and that the other types may be stressed differently.

Variable ratio transmission 20 includes variable diameter sheaves or pulleys 34 and 36 fixed for rotation with their respective shafts 14 and 16 and a continuous V-belt 38. Transmission 20 is a well-known species of transmissions which are known as continuously variable transmissions. Transmission 20 may be any of several types of continuously variable transmissions or as shown in FIG. 5 a discrete ratio transmission. The diameters of pulleys 34 and 36 are readily varied by moving one or both of the halves of one pulley together while separating the halves of the other pulley. When the pulley diameters are the same and clutch 12 is applied, no energy flows to or from shaft 22.

During steady state operation of the vehicle, clutch 12 is preferably unapplied and pulleys 34 and 36 are preferably positioned to have equal diameters so that clutch 12 may be applied without load when a vehicle braking or acceleration mode is initiated. When a deceleration mode is initiated, clutch 12 is applied and the diameter of pulley 34 is made smaller than the diameter of pulley 36, whereby input shaft 14 rotates faster than output shaft 16. This difference in speed of the input and output shafts torsionally stresses or twists the rollers (see phantom lines 39) to effect a delivery of energy from the vehicle drivetrain to the energy storage assembly, thereby slowing or braking the vehicle as energy is accumulated in the storage assembly. For a given rotational speed of shaft 22, deceleration of the vehicle may be increased by further decreasing the diameter of pulley 34 with respect to pulley 36 and deceleration may be decreased by bringing the diameters closer to a one-to-one ratio. When acceleration of the vehicle is desired, clutch 12 is applied and the diameter of pulley 36 is made smaller than the diameter of pulley 34, whereby output shaft 16 rotates faster than input shaft 14. This difference in speed of the input and output shafts torsionally relaxes the rollers to effect a delivery of accumulated energy back to the vehicle drivetrain, thereby accelerating or powering the vehicle. For a given rotational speed of shaft 22, acceleration of the vehicle may be increased by further decreasing the diameter of pulley 36 with respect to pulley 34 and acceleration may be decreased by bringing the diameters closer to a one-to-one ratio.

Thinking now in terms of power rather than just energy, energy storage device 10 is a power splitting energy transfer device which can circulate energy from the storage assembly output at shaft 16 back to the storage assembly input at shaft 14. More specifically, since torque is uniform throughout the energy storage assembly, the torques on shafts 14 and 16 are the same. Hence, the ratio of power flowing into the energy storage assembly along shaft 14 and out of the energy storage assembly along shaft 16 is equal to the speed ratio of the shafts. For example, when the input shaft rotates four times faster than the output shaft, a four-to-one ratio, three units of power flow from shaft 22 into input shaft 14 and one unit of power flows from output shaft 16 into input shaft 18 via transmission 20. Hence, during vehicle deceleration transmission 20 never carries more than a fraction of the power being absorbed by the energy storage assembly. However, during vehicle acceleration, i.e., when power is delivered to the vehicle, transmission 20 must handle all of the power delivered to the vehicle plus the circulating power. For example when the output shaft rotates four times faster than the input shaft, four units of power flow from the output shaft to the input shaft via transmission 20. Three of the four units of power flow to the vehicle via shaft 22 and one of the four power units flows back into the storage assembly.

Looking now at FIG. 2, therein is shown a regenerative braking device 40 as in FIG. 1 but further including a power splitting differential 42 which splits power flowing to and from the vehicle. Components in FIG. 2 identical to corresponding components in FIG. 1 are given the same numbers plus a prime. Differential 42 reduces the power handling requirements of transmission 20' during vehicle acceleration. Device 40 includes all of the components of device 10 in FIG. 1 plus differential 42 and the components necessary to connect the differential between shafts 14', 16', and 22'. Differential 42 is a conventional three element differential having side gear elements 44 and 46 and a pair of planet pinion elements 48 and 50. Pinions 48 and 50 are freely rotatable about their axes in a conventional manner. The pinions are connected to clutch 12' by a shaft 52, a gear 54, and a ring gear 56. Side gear 46 is connected to input shaft 14' by a shaft 58 and gears 60 and 62. Side gear 44 is connected to shaft 16' by a shaft 64 and gears 66 and 68. Differential 42 may be any of several well-known devices which allows variable or differential rotation between its elements.

Looking now at FIG. 3 therein is shown a regenerative braking device 70, as in FIG. 2, but further including variable ratio transmissions 72 and 74. Components in FIG. 3 identical to corresponding components in FIG. 1 are given the same numbers plus a prime. Further, components in FIG. 3 identical to the added components in FIG. 2 are given the same number plus a prime. Transmissions 72 and 74 further increase the speed ratios of the energy storage input and output and therefore further reduce the power handling requirements of transmission 20' by reducing the amount of power circulated by transmission 20' in proportion to the amount of power being delivered or accumulated by the energy storage assembly.

Transmission 72 is fixed at its input to input shaft 14' and at its output to an added shaft 76 which is fixed to the left end 24a' of rubber roller 24'. Transmission 74 is fixed at its output to output shaft 16' and at its input to an added shaft 78 which is fixed to the right end 26a' of rubber roller 26'.

Transmissions 72 and 74 may be of the continuously variable type or of the discrete ratio type. One example of a discrete ratio type transmission which may be employed is illustrated by the planetary gear set 80 of FIG. 4. Gear set 80 includes plurality of input planet gears 82 driven by a planet carrier 84, and output sun gear 86, a ring gear 88, and a ring gear brake 90. When the gear set is used to provide a speed increasing ratio, a one-way clutch may be included, such as one-way clutch 92 having a clutch element 94 fixed for rotation with carrier 84 and a clutch element 96 fixed for rotation with sun gear 86. When viewing one-way clutch 92 from the left in FIG. 4, the clutch freely overruns when element 94 rotates counterclockwise relative to element 96 and locks up when element 94 tends to rotate clockwise relative to element 96. Assuming carrier 84 always rotates clockwise, when brake 90 is applied to hold ring gear 88, planet gears 82 rotate sun gear 86 clockwise faster than carrier 84; hence, one-way clutch 92 freely overruns, whereby the gear set provides a speed increasing ratio. When brake 90 is released or unapplied, carrier 84 tends to rotate faster clockwise than sun gear 86; hence, one-way clutch 92 locks up, whereby the gear set provides a one-to-one speed ratio.

When planetary gear set 80 is inserted into the device of FIG. 3 as transmission 72, Carrier 84 is fixed to input shaft 14' and sun gear 86 is fixed to added shaft 76. When the planetary gear set is inserted as transmission 74, carrier 84 is fixed to output shaft 16' and sun gear 86 is fixed to added shaft 78. Further, one-way clutch 92 is replaced by a clutch which is actuated when brake 90 is released; hence, planetary gear set 80 provides a speed reduction ratio when brake 90 is applied and provides a one-to-one ratio when the unshown clutch replacing clutch 92 is applied. With the planetary gear sets thus inserted into the regenerative braking device of FIG. 3, operation of the device is as follows: when transmissions 72 and 74 provide a one-to-one ratio between their respective inputs and outputs, device 70 will operate the same as device 40 in FIG. 2, i.e., circulating power in the continuously variable transmission of both devices is the same. During vehicle braking, if transmission 72 is shifted to provide a speed increasing ratio and transmission 74 remains in the one-to-one speed ratio, the input speed to the energy storage assembly will increase relative to the output speed; hence, the amount of power flowing into the energy storage assembly will increase while the instantaneous amount of power flowing out of the storage assembly and back through the continuously variable transmission will remain unchanged. During vehicle acceleration, if transmission 72 remains in the one-to-one speed ratio and transmission 74 is shifted to provide a speed reduction ratio, the output speed of the energy storage assembly will increase relative to the input speed; hence, the amount of power flowing from the energy storage assembly will increase while the instantaneous amount of circulating power flowing into the energy storage assembly through the continuously variable transmission will remain the same. It should be clear that transmissions 72 and 74 may each provide several speed ratios or that either one of the transmissions may be dispensed with. Further, the result obtained by using additional transmissions such as transmissions 72 and 74 could be obtained by increasing the speed ratio capability of the continuously variable transmission; however, to do so would increase the size of the continuously variable transmission.

Looking now at FIG. 5, therein is shown a regenerative braking device 100 wherein the continuously variable transmission in FIGS. 1-3 is entirely replaced by discrete ratio transmissions. As in the other embodiments, components in FIG. 5 identical to components in the other figures will be given the same numbers plus a prime. The embodiment of FIG. 5 is analogous to the embodiment of FIG. 1 and is readily made analogous to the embodiment of FIG. 2 by merely adding the power splitting differential. It should suffice to merely state that output shaft 16' of transmission 74' is drivingly connected to input shaft 14' in a one-to-one speed ratio by a continuous chain 102 and that the output of transmission 72' may be connected to the input of the energy storage assembly by a speed increasing or reducing drive via a continuous chain 104, as shown, or by connecting shaft 76' directly as in FIG. 3.

Looking now at FIG. 6, therein is shown a regenerative braking device 110 as in FIG. 1 but further including a power isolating assembly 112. As in the other embodiments, components in FIG. 5 identical to components in the other figures will be given the same number plus a prime. The embodiment of FIG. 6, is basically analogous to the embodiment of FIG. 2 and is readily made analogous to the embodiment of FIG. 3 by merely adding the transmissions 72 and 74.

The power isolating assembly 112 includes an input gear 114 fixed to clutch 12' by a shaft 116, gears 118 and 120 in mesh with gear 114 and connectable to the input and output shafts 14' and 16' by clutches 122 and 124. During a vehicle braking mode, clutches 12' and 122 are applied and clutch 124 is released, thereby directing all of the braking power into the energy storage assembly as in FIG. 1. During a vehicle acceleration mode, clutches 12' and 124 are applied and clutch 122 is released, whereby all of the power for acceleration bypasses the continuously variable transmission.

Several embodiments of the invention have been disclosed for illustrative purposes. Many variations and modifications of the embodiments, beyond those mentioned, are believed to be within the spirit of the invention. The following claims are intended to cover the inventive portions of the several embodiments and the variations and modifications within the spirit of the invention.

What is claimed is:

1. A regenerative braking device adapted for connection to a mass having variable kinetic energy, said device comprising:
    input drive means mounted for rotation and adapted for driving connection to said mass;
    output drive means mounted for rotation;
    energy storage means drivingly connected between said input and output drive means, said storage means operative to accumulate energy from said mass when said input drive means rotates faster than said output drive means and operative to deliver accumulated energy to the mass when said output drive means rotates faster than said input drive means; and
    variable ratio means drivingly interconnecting said input and output drive means for varying the rotational speed of said input drive means relative to said output drive means.

2. The device of claim 1, wherein said variable ratio means is a continuously variable transmission.

3. The device of claim 1, further including:
    a clutch operative when applied to connect said mass with said input drive means.

4. The device of claim 1, wherein said variable ratio device includes:
    variable diameter pulleys drivingly connected to said input and output drive means.

5. The device of claim 1, wherein said variable ratio means includes:
    discrete ratio transmission means.

6. The device of claims 1, 2, 3, 4, or 5 wherein said variable ratio means transmits some of said accumulated energy from said output drive means back to said input drive means when said input drive means rotates faster than the said output drive means, and delivers at least a portion of said accumulated energy to said mass when said output drive means rotates faster than said input drive means.

7. The device of claims 1, 2, 3, 4, or 5 further including:
    a three element differential having first and second of said elements drivingly connected, respectively, with said input and output drive means and a third of said elements drivingly connectable with said mass and drivingly interconnecting said first and second elements, said differential operative to transmit at least a portion of said accumulated energy to said mass via said third element when said output drive means rotates faster then said input drive means.

8. The device of claims 1, 2, 3, 4, or 5 further including:
    second variable ratio means interposed between said input drive means and said energy storage means for further varying the rotational speed ratio of said input and output drive means.

9. The device of claims 1, 2, 3, 4, or 5, further including:
    second variable ratio means interposed between said output drive means and said energy storage means for further varying the rotational speed ratio of said input and output drive means.

10. The device of claims 1, 2, 3, 4, or 5, further including:
    second variable ratio drive means interposed between said input drive means and said energy storage means; and
    a third variable ratio means interposed between said output drive means and said energy storage means, said second and third variable ratio means for further varying the rotational speed ratio of said input and output drive means.

11. The device of claims 1, 2, 3, 4, or 5, wherein said energy storage means includes:
    at least one elastic member mounted for rotation and drivingly connected between said input and output drive means, said elastic member torsionally stressed to accumulate energy from said mass when said input drive means rotates further than said output drive means and torsionally relaxed to deliver accumulated energy to said mass when said output drive means rotates faster than said input drive means.

12. The device of claim 11, wherein said energy storage means includes a plurality of said elastic members drivingly connected in series between said input and output drive means.

13. The device of claim 1, further including:
a pinion gear connectable to said mass;
first and second gears in mesh with said pinion and nondifferentially rotated with respect to each other; and
clutch means respectively operative to alternately connect said first gear with said input drive means and said second gear with said output drive means.

14. The device of claim 13, wherein said clutch means includes:
a first clutch interposed between said first gear and said input drive means; and
a second clutch interposed between said second gear and said output drive means.

15. A regenerative braking device adapted for connection to a drivetrain of an automotive vehicle, said device comprising:

an input shaft mounted for rotation and adapted for connection to said drivetrain;
an output shaft mounted for rotation;
an energy storage assembly including resilient means mounted for rotation and connected at its input and output, respectively, to said input and output shafts, said resilient means torsionally stressed to accumulate energy from said drivetrain when said input shaft rotates faster than said output shaft and torsionally relaxed to deliver accumulated energy to said drivetrain when said output shaft rotates faster than said input shaft; and
a variable ratio means drivingly interconnecting said input and output shafts.

16. The device of claim 15, wherein said variable ratio means is a continuously variable transmission.

17. The device of claim 15 further including:
a pinion gear connectable to said drivetrain via a shaft fixed to said pinion;
first and second nondifferentially rotatable gears in mesh with said pinion;
first and second clutches interposed, respectively, between said first and second gears, said first clutch applied when said device is to accumulate energy, and said second clutch applied when said device is to deliver energy.

* * * * *

UNITED STATES PATENT AND TRADEMARK OFFICE
CERTIFICATE OF CORRECTION

PATENT NO. : 4,310,079
DATED : January 12, 1982
INVENTOR(S) : Lyle O. Hoppie

It is certified that error appears in the above-identified patent and that said Letters Patent are hereby corrected as shown below:

In column 1, line 13, immediately preceeding the heading "FIELD OF THE INVENTION", insert:

-- The Government has rights in this invention pursuant to Subcontract No. 2617509 under Contract No. W-7405-ENG-48, awarded by the U.S. Department of Energy. --

Signed and Sealed this

Third Day of May 1983

[SEAL]

Attest:

GERALD J. MOSSINGHOFF

Attesting Officer

Commissioner of Patents and Trademarks